United States Patent Office 3,006,447
Patented Oct. 31, 1961

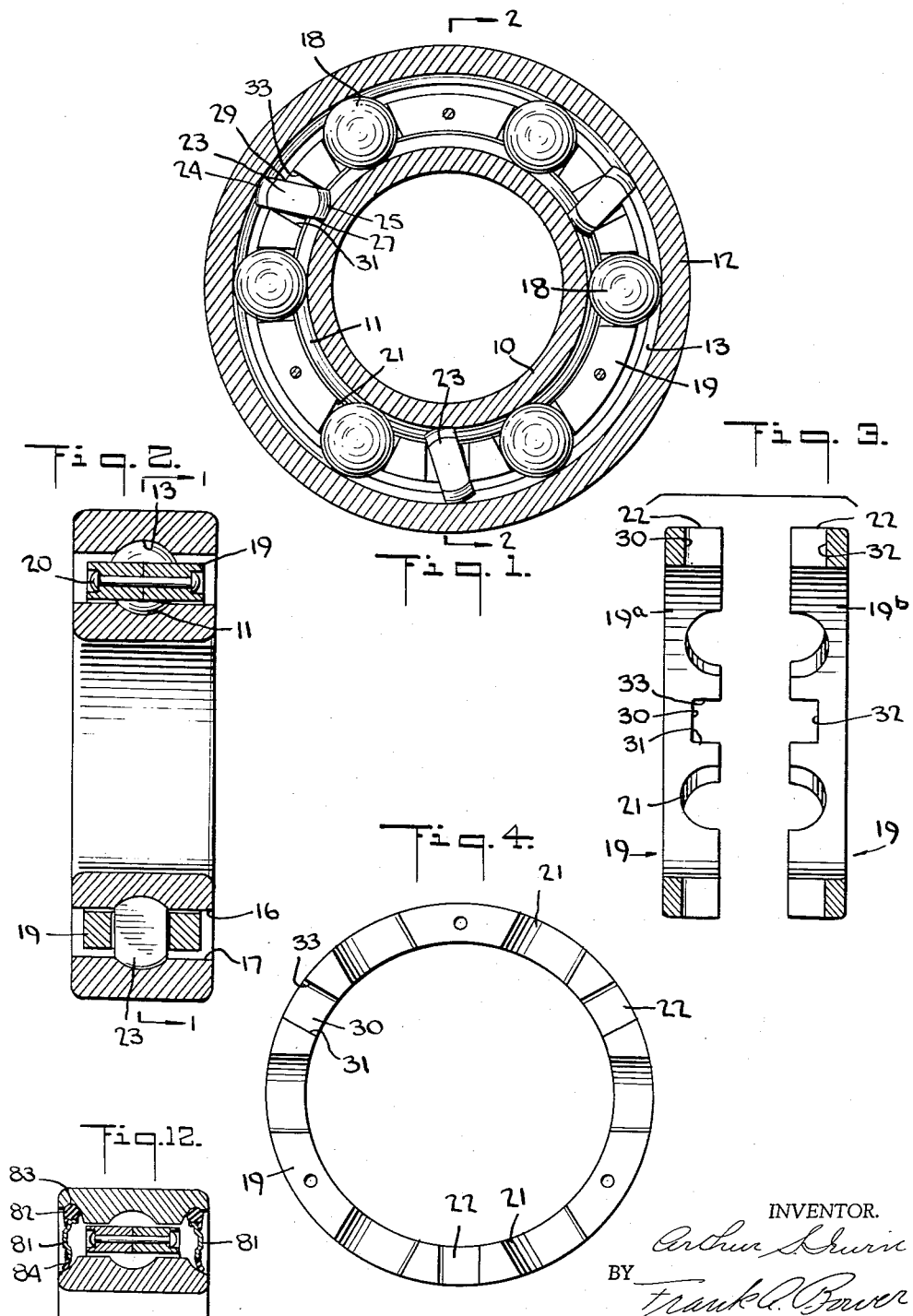

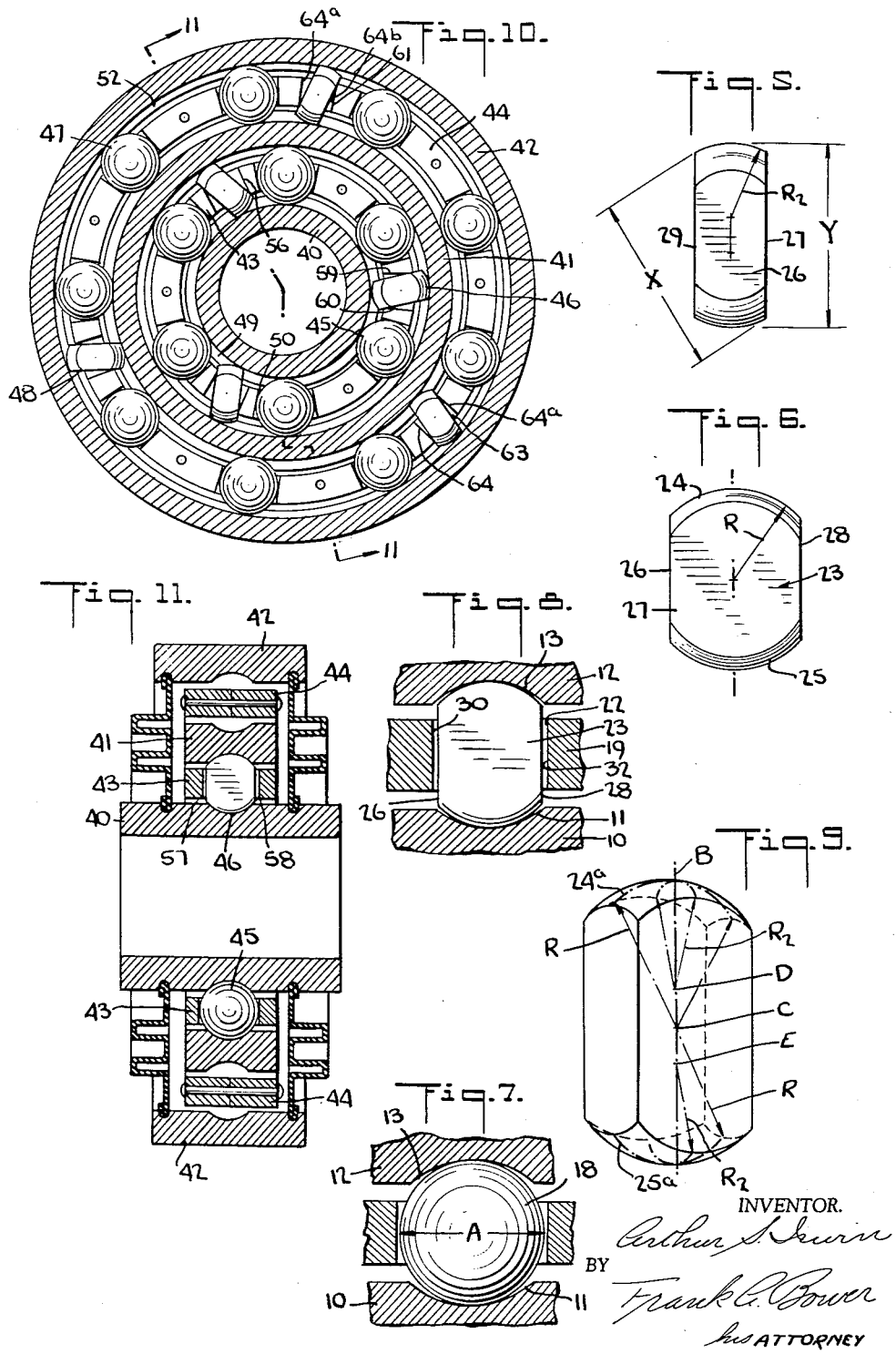

3,006,447
SPRAG CLUTCH BEARING
Arthur S. Irwin, Jamestown, N.Y., assignor to Marlin-Rockwell Corporation, Jamestown, N.Y., a corporation of Delaware
Filed Apr. 15, 1958, Ser. No. 728,602
2 Claims. (Cl. 192—45.1)

This invention relates to ball type bearings combined with a one-way clutch means to permit relative rotation between the inner and outer races in one direction and to prevent relative rotation in the opposite direction.

An object of the invention is to provide a bearing and one-way clutch means in which the clutch means are carried by the retaining ring and engage the groove surfaces in which the bearing balls travel and, further, to combine a bearing with a one-way clutch means that can carry radial loads and axial thrust.

Other and further objects of the invention will become apparent from the following description taken in connection with the accompanying drawings in which FIG. 1 illustrates a sectional view of the bearing taken along lines 1—1 of FIG. 2;

FIG. 2 illustrates a sectional view of the bearing taken along lines 2—2 of FIG. 1;

FIG. 3 illustrates a sectional view of the retaining cage, with the cage separated into two parts;

FIG. 4 shows an inner end view of one part of the retaining cage;

FIGS. 5 and 6 are side views of the sprag;

FIG. 7 illustrates the relation between a load bearing ball and the outer race;

FIG. 8 illustrates the relationship between a gripping sprag and the outer race;

FIG. 9 is a perspective view illustrating the formation of the rounded ends of the sprag;

FIG. 10 shows a sectional view of a double sprag type clutch bearing;

FIG. 11 is a sectional view of the double sprag clutch bearing taken along lines 11—11 of FIG. 10; and FIG. 12 sectionally illustrates the embodiment shown in FIGS. 1 and 2 with a seal.

In the embodiment shown in FIGS. 1 to 9, the bearing comprises an inner ring 10 with a circumferentially extending race 11 and an outer ring 12 with a circumferentially extending race 13. The inner and outer rings are cylindrical in shape and the inner ring is concentric with the outer ring. Bearing balls 18 are positioned between the inner and outer rings fitting in the races 11 and 13. The balls are evenly spaced circumferentially by a retaining cage or ring 19 which is formed in to identical pieces 19a and 19b secured by rivets 20. The cage also carries the sprags 23 fitting in the races 11 and 13.

The inner and outer rings are preferably made of steel and have a cylindrical shape with inner surfaces 16 and 17 facing one another. The races 11 and 13 are intermediately positioned in the surfaces and are concentric in relation to one another so that the bearing balls 18 travel in the races and transmit between the races radial loads applied to the bearing. The races 11 and 13 are of the deep groove type and in addition to carrying a radial load, the races carry a considerable thrust load.

The bearing balls 18 are also preferably made of steel and are spherical in shape having a diameter A. In this embodiment six balls are provided evenly spaced around the bearing by the retaining ring 19. The retaining ring is preferably made of bronze and has an inner diameter slightly greater than the diameter of the surface 16 and an outer diameter somewhat less then the inner diameter of the surface 17. The retaining ring thereby fits close to the inner ring and is spaced from the outer ring as illustrated. The retaining ring has an axial length less than the axial length of the inner and outer rings so that the sides of the rings extend axially on each side of the retaining ring. The retaining ring has cylindrical openings 21 for holding the balls 18. The openings have a uniform diameter and the longitudinal axis extends radially to project through the axis of the bearing. The diameter of the opening is slightly larger than the diameter of the ball to maintain the ball in rolling contact relation with the inner and outer rings.

Each of the sprags 23 has a generally rectangular shape with rounded ends for engaging the inner and outer rings. The side surfaces 26, 27, 28 and 29 are flat and extend in planes at 90° to the adjacent sides so that each sprag has a rectangular lateral cross section. The ends have generally rounded surfaces formed as indicated in FIGS. 5, 6, 8, 9. The surfaces 26 to 29 form an axis B extending through the end surfaces. The end surfaces are defined by imaginary geometric elements $24a$ and $25a$ indicated by the dot and dash lines. In a midposition the elements are in a plane parallel to the surfaces 27 and 29. The parallel plane also includes the axis B. The elements $24a$ and $25a$ throughout their lengths are equidistant a radius R from the point C on the axis B. This radius is equal to or less than the radius of the surfaces of the races 11 and 13 and the radius of the balls 18. The surfaces 24 and 25 are defined by rotating elements $24a$ and $25a$ about points D and E. Points D and E are located on the axis B and are positioned at equal distances above and below the point C to form a radius $R_2$ slightly less than the radius of the outer ring raceway radius. Elements $24a$ and $25a$ are rotated about a respective point to define the surfaces 24 and 25. The diagonal distances X are less than the central distance Y along the axis B. Also, X must be slightly less than A and Y must be slightly greater than A. The curvature of the elements $24a$ and $25a$ is approximately the same as but not greater than the curvature of the races 11 and 13 so that as the sprag is tilted to reduce the angle between axis B and a radial line through the center of the bearing, a greater portion of the area of the rounded ends comes into contact with the surfaces of the races to increase the frictional gripping of the sprags against the races. The sprags are of a slightly softer steel than the inner and outer rings to prevent any possible nicking of the races on a gripping action. For example, the sprags may be 60 points on the Rockwell "C" scale and the inner and outer races 62 points on the Rockwell "C" scale.

The retaining ring 19 has rectangular slots 22 with sides 30, 31, 32 and 33 parallel to a radial axis. The sprags 23 fit into the slots 22 with the sides 26 and 28 engaging the sides 30 and 32 of the slots. The retaining ring positions the sprags between the races so that the sprags are self-aligning in relation to the races.

The sides 27 and 29 of the sprags extend at an angle to the radial axis through the opening. The side 27 engages the outer end of the side 31 of the retaining ring and the side 29 engages the inner end of the side 33 of the retaining ring. The sides 30 and 32 of the slots extend a distance circumferentially to space the axially extending sides 31 and 33 so that the axis B of the sprag is at an angle to the radial axis through the slot. The diagonal having the dimension X is positioned between the inner and outer races 11 and 13. On rotation of either ring the surfaces 24 and 25 are in sliding relation with the races. The area of contact between the end surfaces and the races is at a minimum and the pressure applied to the sprags is also at a minimum.

The bearing balls 18 set in the races 11 and 13 in the customary manner and are spaced slightly from the sides of the cylindrical openings 21 to ensure the rotation of the bearing balls in the retaining ring. When the outer ring is held stationary and the inner ring is rotated, the bearing ball is rolled on the outer stationary race and presses against the cylindrical wall of the opening 21 to rotate the retaining ring about the axis of the bearing. The side 31 engages the side 29 at the outer end thereof. This force tends to tilt the sprag closer to the radial. However, the inner race is rotating in the same direction as the application of the force so that a tilting action does not occur and the sprag maintains a sliding relation with the inner and outer rings. The inner race is rotating faster than the retaining ring and, therefore, carries the inner rounded end 25 at a greater speed than the surface 31 contacting the sprag. Thus, the sprag retains its tilted position in relation to the axis. However, on reversal of rotation of the inner race, the direction of revolution of the bearing balls is reversed and presses against the opposite side of the opening to rotate the retaining cage in the opposite direction. The side 33 engages the sprag in the direction as indicated and the inner ring tends to rotate in the same direction. This movement of the retaining ring and the inner ring rotates the sprag about the end 24 engaging the stationary ring to reduce the angle of tilt and wedge the sprag so that the inner ring cannot rotate. The sprag is rotated to bring the greatest surface into contact with the grooves. As a greater reversal force is applied to the inner ring, the area of contact between the end surfaces 24 and 25 and the respective grooves increases as the sprag is urged further to the radial position. The inner ring may be held stationary and the outer ring rotated in a counterclockwise direction. The side 33 engages the side 29 of the sprag. However, the outer ring moving at a greater speed maintains the sprag in the tilted or non-gripping position. On the application of a force tending to rotate the outer ring clockwise, the bearing balls 18 bear against the retaining ring which presses the wall 31 against the side 29 of the sprag to urge it into a more radial position. The inner race is stationary and the sprag tends to rotate. Thus, when a ring is rotating, the force of the retaining ring and the rotation of the rotating ring act in the same direction about the stationary end member to urge the sprag into a non-gripping position and on reversal of the race, the force of the retaining ring and the race are in the same direction to rotate the sprag into a gripping position. Thus, a rapid gripping action is secured to immediately lock the races relative to one another in one direction and permit a free rotation in the opposite direction.

The rounded end surfaces of the sprag engage the groove surfaces on which the bearing balls roll. This provides a very simplified and inexpensive type of bearing and one-way clutch arrangement. No additional grooves or surfaces are required for the sprags and the races in the rings will carry a thrust which is applied to the sides of the grooves by the bearing balls and by the sprags so that the bearing can withstand large axial thrust. The bearing may be assembled by positioning the inner ring inside the outer ring and placing the bearing balls and sprags between the races in an accepted manner, spacing them circumferentially and fitting the halves of the retaining ring to properly distribute the bearing balls and sprags around the bearing.

In FIG. 10 a different embodiment of the invention is illustrated in which three rings 40, 41 and 42 are provided concentrically arranged with retaining rings 43 and 44 between rings 40, 41 and 41, 42, respectively. The retaining ring 43 carries balls 45 and sprags 46. The retaining ring 44 carries balls 47 and sprags 48. The inner ring 40 has a race 49 facing and concentric with the race 50 on the intermediate ring 41. The outer ring 42 has a race 52 facing and concentric with the race 51 on the intermediate ring 41. The races are axially curved and have a radius slightly larger than the radius of the balls. The sprags are similar in shape to the sprags of the previous embodiment and rotate on a gripping action to engage axially across nearly the entire width of the race.

The retaining rings 43 and 44 are similar in structure and each is formed in two parts. The ring 43 has rectangular openings 55 for holding the balls and rectangular slots 56 for holding the sprags. The slot 56 has sidewalls 57 and 58 and endwalls 59 and 60. The walls extend in planes parallel to the radial axis extending through the center of the slot. The retaining ring 44 has rectangular openings 61 for holding the sprags. The slots holding the sprags have sidewalls 63 and endwalls 64a and 64b which also extend parallel to the radial axis through the center of the slot.

The sprags are normally held in the retaining ring at an angle to the radial axis and in a non-gripping position the area adjacent the smaller dimension W extends radially. On the occurrence of a gripping action the sprag is rotated so that the area adjacent the larger dimension is brought into contact with the bearing surfaces to grip and lock the surfaces.

The gripping and non-gripping action of the sprags 46 and 48 is similar to that previously described in connection with sprags 23. The end surfaces 59 and 60 and 64a, 64b are spaced circumferentially to permit the sprags to assume a non-gripping position at an angle to the radial axis with the dimension smaller than the space between the sprag positioned generally radially. The sprags are tilted into the gripping position by the engagement of the retaining ring against the side of the sprag and the rotation of the sprag into a gripping position.

The sprags 46 are tilted on the opposite side of the radial from the sprags 48. By this arrangement the inner ring 40 can be rotated in only one direction relative to the inner ring 41 and the outer ring 42, similarly, can only be rotated in one direction relative to the intermediate ring 41. Thus, when the outer ring is held stationary, the inner ring can only rotate in a clockwise direction and when the inner ring is held stationary, the outer ring can be rotated only in a clockwise direction relative to the intermediate ring 41. When the outer ring is held stationary and the inner ring rotated in a counterclockwise direction, the sprags 46 lock the inner ring and the intermediate ring against relative rotation and the intermediate ring rotates counterclockwise to the outer ring. When the outer ring is rotated counterclockwise, the sprags 48 lock the inner and intermediate rings together so that the inner ring 40 rotates in a counterclockwise direction. Thus, the inner and outer rings 40 and 42 may rotate relative to one another in either direction as in the case of a bearing with only inner and outer rings, and yet the races in which the rollers engage can rotate only in one direction relative to one another. This is very advantageous where the inner and outer rings are oscillated relative to one another since fretting or fretting corrosion of the races is prevented. With the elimination of fretting corrosion a substantially smaller bearing may be used. The size of the bearing required for oscillatory motion may be reduced to approximately one-sixth of the size normally used.

Thus, the bearing shown in FIG. 10 when subjected to an oscillatory motion between the inner and outer rings may carry a load six to ten times as great as an ordinary bearing subjected to a similar oscillatory motion. In some applications of the bearing the inner and outer races are oscillated 90° relative to one another, or through a 45° arc. When the bearing is operated in this oscillating manner, it may be hermetically sealed with elastic seals or diaphragms 72 and 73. The seals have concentric corrugations to give flexibility to the seals without unduly extending the material of the seals. The seals may be made of rubber or other suitable material resistant to deterioration by the lubricant. The seals fit snugly in circumferentially extending grooves 77, 78, 79 and 80 which firmly hold the edges of the seals against relative rotation with a respective race to seal against the entry of dust or other foreign matter. The seal is impervious to dust and with the edges sealed with the races, the moving surfaces of the bearing are protected from outside contamination, thus increasing the life of the bearing.

The embodiment shown in FIG. 1 may have seals 81 to enclose the bearing as illustrated in FIG. 12. The seals are located on opposite sides of the bearing and each seal has a synthetic rubber bead 82 fitting in a groove 83 to hold the seal in place. The seal has a flexible inner angular portion 84 engaging the surface of the curved groove 85 to seal the bearing. Thus, the bearing is totally enclosed by the seals.

It is thus seen that the invention may be adapted to various forms to produce compact, simplified bearing clutch structures. A minimum of parts is required and the sprags respond immediately to the reversal in rotation of the turning race. The end surfaces of the sprag are brought into greater surface contact as a greater reversing pressure is applied to the race. This pressure is applied to the bearing surfaces on which the ball bearings or roller bearings rotate without producing any wear or deformation of the bearing surface so that the one-way clutch bearing has a long life.

Various modifications and changes may be made without departing from the scope of the invention as set forth in the appended claims.

I claim:

1. A sprag-type one-way clutch bearing comprising outer, inner and intermediate rings with the intermediate ring having an inner and an outer race and said outer and inner rings each having a race facing a respective race on said intermediate ring, retaining cages between said inner and intermediate rings and between said intermediate and outer rings, each of said cages having two sets of circumferentially spaced openings with the openings of each set circumferentially aligned, anti-friction elements in a respective set of openings engaging a respective race at bearing areas moving with said anti-friction elements, a set of sprags in the other set of openings in one retaining cage and a set of sprags in the other set of openings in the other retaining cage, each sprag having rounded ends for engaging said races over gripping areas generally circumferentially aligned with the bearing areas of a corresponding set of anti-friction elements, said sprags of one set tilted at an opposite angle to the radial from the other set of sprags to lock the intermediate ring relative to the movement of either of the other rings whereby the anti-friction elements between the outer race and intermediate race move solely in one direction and the anti-friction elements between the intermediate race and the inner race move solely in the other direction to prevent fretting of the races on occurrence of oscillatory motion between the inner and outer races.

2. A sprag-type one-way clutch bearing comprising inner and outer concentric rings each with a circumferentially extending race having a circular surface, a retaining cage positioned between and concentric with said rings and having two sets of openings with the openings circumferentially spaced and the openings of one set circumferentially aligned with the openings of the other set, ball bearings having a radius slightly less than the axial radius of the races and positioned in one set of openings between said rings and engaging said races at bearing areas moving with said ball bearings on rotation to transfer radial forces between said rings, sprags having end surfaces having an imaginary element equidistant in the central plane from a center point on the central axis a distance greater than the radius of the bearing ball and less than the radius of the axial curvature of the race, said surfaces being defined by rotating said respective elements each about a second point having a radius less than said first radius to decrease the length of the diagonal of the sprag on rotation from the central axis, said sprags positioned in the other set of openings at an angle to the retaining cage to engage said races over gripping areas generally circumferentially aligned with the bearing ball bearing areas and over an axial area having a length greater than the ball bearing area for statically locking said rings in the reverse direction.

References Cited in the file of this patent

UNITED STATES PATENTS

| | | |
|---|---|---|
| 1,810,283 | Ljungstrom | June 16, 1931 |
| 2,113,722 | Dodge | Apr. 12, 1938 |
| 2,154,212 | Moorhouse | Apr. 11, 1939 |
| 2,412,803 | Dodge | Dec. 17, 1946 |
| 2,423,178 | Dodge | July 1, 1947 |
| 2,520,004 | Gondek | Aug. 22, 1950 |
| 2,685,944 | Faucher et al. | Aug. 10, 1954 |

FOREIGN PATENTS

| | | |
|---|---|---|
| 412,898 | Great Britain | July 5, 1934 |